Patented Jan. 2, 1940

2,185,254

UNITED STATES PATENT OFFICE 2,185,254

INTERNAL COMBUSTION ENGINE

Victor W. Kliesrath, South Bend, Ind., assignor to Bendix Products Corporation, South Bend, Ind., a corporation of Indiana Application June 28, 1937, Serial No. 150,722

2 Claims. (Cl. 123—65)

This invention relates to internal combustion engines.

An object of the invention is to provide an improved charge-forming means for an internal combustion engine of the two-cycle type.

Another object of the invention is to provide a combined charge-forming means and supercharger for an internal combustion engine.

Another object of the invention is to provide a supercharger for an internal combustion engine constructed and arranged so as to function as a charge-forming means for the engine.

Yet another object of the invention is to provide a combined charge-forming means and supercharger for an internal combustion engine operative to carburet air with a volatile liquid, to force the charge into the combustion chamber of the engine, and to heat the charge by the burnt gases resulting from the explosion of the preceding charge.

Other objects of the invention will appear from the following description taken in connection with the drawings forming a part of this specification, and in which.

Figure 1:
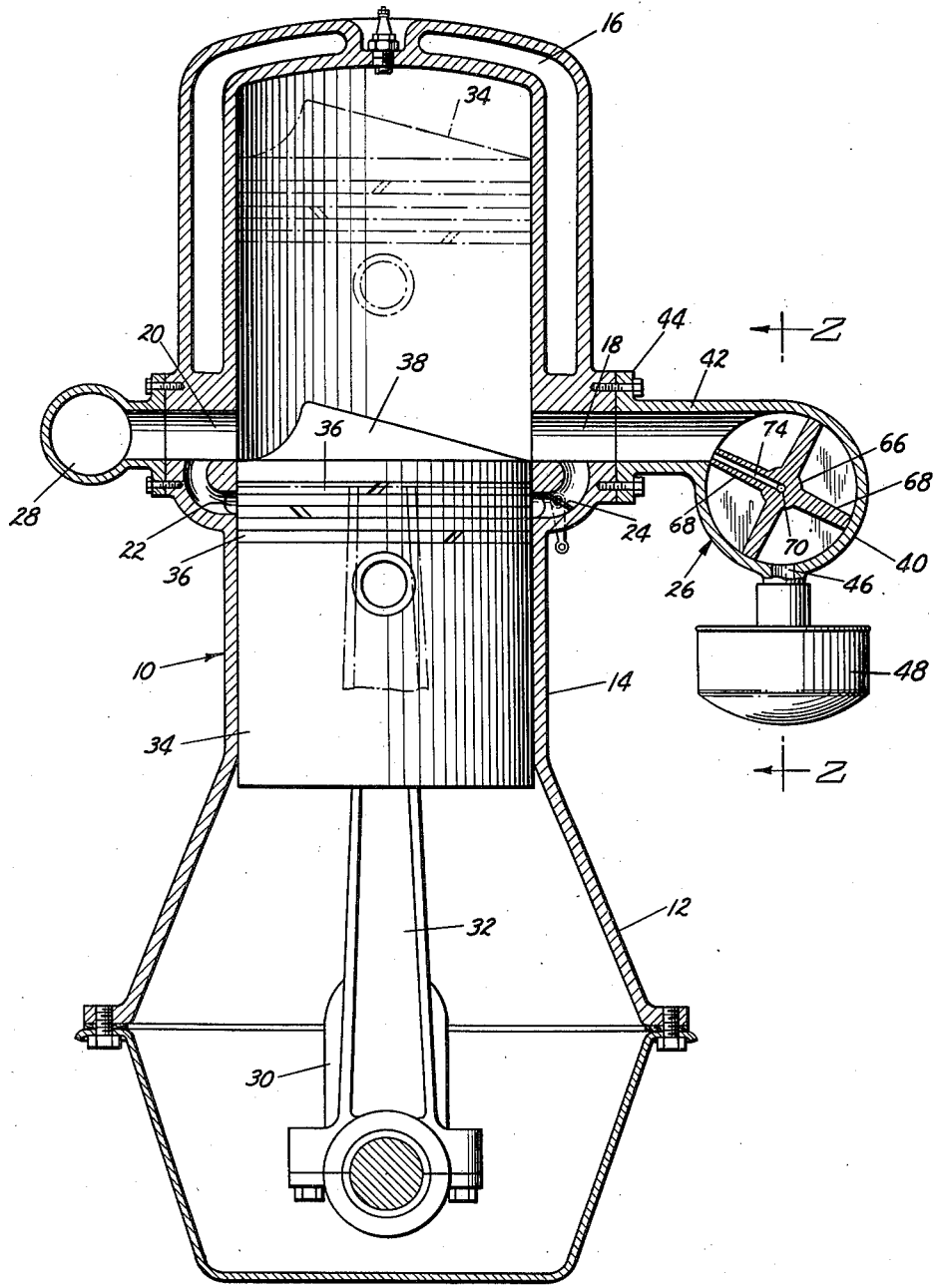
Fig. 1 is a vertical sectional view of an internal combustion engine embodying the invention.
Figure 2:
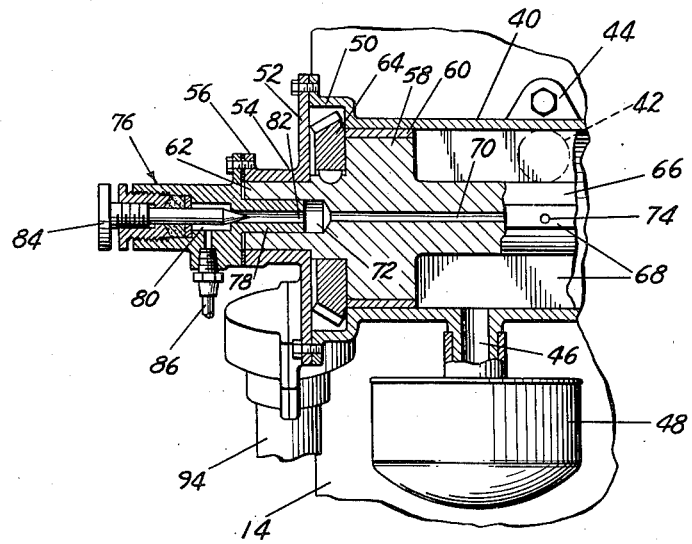
Fig. 2 is a fragmentary view of the combined charge-forming means and supercharger.
Figure 3:
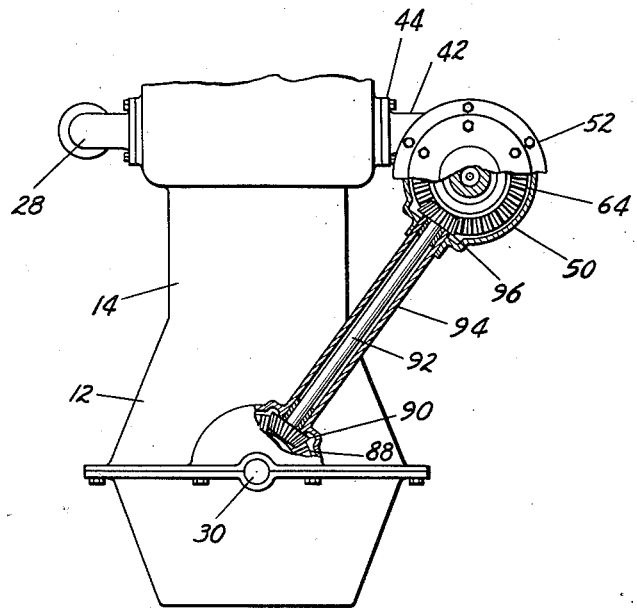
Fig. 3 is a fragmentary view illustrating the driving mechanism of the combined charge-forming means and supercharger.

In the illustrated embodiment of the invention, 10 represents an internal combustion engine of the two-cycle type including a crank case 12 supporting a cylinder 14, water jacketed as indicated at 16. The cylinder has an intake port 18 and an exhaust port 20, arranged in oppositely disposed relation to one another in the wall of the cylinder immediately below the water jacket and connected as by an annular passage 22 controlled by a valve 24. A combined charge-forming means and supercharger indicated generally at 26 is connected to the intake port 18, and a conventional exhaust pipe 28 is connected to the exhaust port 20.

A crank shaft 30 suitably journaled in the respective ends of the crank case 12 is connected by a conventional connecting rod 32 to a piston 34 reciprocable in the cylinder 14. The piston carries a plurality of leak-proof rings 36 of conventional type and arranged on the head of the piston is a baffle 38 for directing the charge entering the intake port 18 upwardly in the cylinder 14 so as to render the scavenging action more effective.

During the compression stroke of the piston 34 the intake port 18, the exhaust port 20, and the passage 22 connecting the intake and exhaust ports are closed, and at the end of the compression stroke of the piston immediately preceding the explosion of the compression charge the passage 22 is uncovered to establish communication between the intake and exhaust ports so that a small portion of the burnt gases of the preceding charge may be admitted by way of the valve 24 to the intake port 18 to the end that the next succeeding charge may be heated. This is found highly desirable when the engine is operated at low speed, as when idling. The means for actuating the valve 24 are not disclosed, since they are well-known and form per se no part of the present invention.

The combined charge-forming means and supercharger 26 includes a cylindrical housing 40 having a duct 42 communicating therewith. As shown, the free end of the duct has a marginal flange 44 suitably secured to the wall of the cylinder 14 so as to support the duct coextensive with the intake port 18. The housing also has an air intake port 46 suitably connected to a conventional air cleaner 48. One end of the housing is open, and a small portion of the housing immediately adjacent this open end has an increased diameter providing a secondary housing 50 closed as by a cover plate 52 provided with an outwardly extending concentric sleeve or bearing 54 having a marginal flange 56.

A stub shaft 58 having thereon a suitable bearing 60 is fitted for rotation in the cylindrical housing 40 adjacent the secondary housing 50. This shaft has a concentric extension 62 of reduced diameter fitted for rotation in the bearing 54 on the cover plate 52, and keyed on the extension 62 within the secondary housing 50 is a bevel gear 64, the purpose of which will hereinafter appear. The shaft 58 also has a concentric extension 66 of reduced diameter arranged in oppositely disposed relation to the extension 62 and a plurality of equally spaced radial blades 68 supported on the extension 66 slidably engaging the wall of the housing 40.

The stub shaft 56 and the concentric extensions 62 and 66 thereof are axially bored to provide a passage 70. A portion of this passage in the extension 62 has an increased diameter as indicated at 62, and passages 74 in the blades 68 provide communications between the passage 70 and the duct 42 coextensive with the intake port 18.

A liquid metering device 76 mounted on the flange 56 of the bearing 54 has an extension 78 received by the enlarged portion 72 of the passage 70. This metering device has a chamber 80 and an axial passage 82 providing a communication between the chamber and the passage 70. A needle valve 84 suitably mounted in the head of the chamber 80 controls the passage 82, and a supply pipe 86 connects the chamber 80 to a suitable supply tank, not shown.

A bevel gear 88 suitably secured to the crank shaft 30 meshes with a pinion 90 keyed on one end of a shaft 92 supported for rotation in a suitable housing 94, and a pinion 96 keyed on the other end of the shaft 92 meshes with the bevel gear 64 keyed on the extension 62 of the stub shaft 58. The gear 88 rotates with the crank shaft 30 and drives the pinion 90 and consequently the shaft 92 and the pinion 96 keyed to the shaft. The pinion 96 drives the gear 64 on the stub shaft 58. This results in operation of the combined charge-forming means and supercharger 26.

Assuming that the valve 84 is adjusted to properly regulate the flow of a liquid through the passage 82 into the metering device 76, under these conditions, upon starting the engine, the train of gearing hereinabove described connecting the crank shaft 30 to the stub shaft 56 of the combined charge-forming means and supercharger 26 operates this mechanism proportionately to the speed of the engine.

Upon rotation of the stub shaft 58, the blades 68 on the extension 66 of the shaft 58 draw air through the air cleaner 48 into the housing 40 and simultaneously therewith liquid from the source of supply enters the chamber 80 of the liquid metering device 76, flows past the needle valve 84, through the passage 82 controlled thereby, into and through the axial passage 70 in the shaft 58 and is expelled by centrifugal force through the passages 74 in the blades 68 on the shaft, carbureting the air as it is discharged by the supercharger through the sleeve 42 and intake port 18 into the combustion chamber of the engine.

As the charge enters the combustion chamber it is deflected upwardly by the baffle 38 on the head of the piston so as to more effectively scavenge the chamber. Immediately after the charge has been forced into the combustion chamber by the combined charge-forming means and supercharger 26, the piston 34 moves on its compression stroke closing the intake port 18 and the discharge port 20 and compressing the charge.

At the end of the compression stroke of the piston the passage 22 is uncovered to establish communication between the intake port 18 and the exhaust port 20 so that heated gases resulting from the explosion of the previous charge may be admitted past the valve 24 into the intake port, where it mixes with and serves to heat the next succeeding charge. This is found particularly desirable when the engine is running at low speed. Upon explosion of the charge the piston 34 is returned to its retracted position, wherein the intake port 18 and the exhaust port 20 are open, thus completing the cycle.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. In combination with an internal combustion engine having intake and discharge ports and a controlled passage connecting the ports, a charge-forming device for the engine comprising a casing having an intake port and a horizontal discharge port directly communicating with the intake of the engine, a rotor in the casing having a passage therethrough, means for driving the rotor from the engine, and means for metering liquid through the passage.

2. In combination with an internal combustion engine having intake and discharge ports and a controlled passage connecting the ports for directing burnt gas into the intake port, a charge-forming device comprising a casing having an intake port and a horizontal discharge port directly communicating with the intake of the engine, a rotor in the casing having a passage extending therethrough arranged to intermittently communicate with the discharge port of the casing, means for metering liquid through the passage, and means for driving the rotor from the engine.

VICTOR W. KLIESRATH.